United States Patent
O'Leary et al.

(10) Patent No.: US 10,002,075 B1
(45) Date of Patent: Jun. 19, 2018

(54) MANAGING MEMORY RESOURCES IN A NETWORK ENVIRONMENT IN ORDER TO HANDLE QUERYING OF LOGICAL DATA STRUCTURES

(71) Applicant: Aggregate Knowledge, Inc., San Mateo, CA (US)

(72) Inventors: Paul Guadalupe O'Leary, San Francisco, CA (US); Christopher Charles Campbell, Oakland, CA (US); David Andrew Starke, San Francisco, CA (US); Joseph Francis Brightly, San Francisco, CA (US)

(73) Assignee: Aggregate Knowledge, Inc., San Mateo, CA (US)

( * ) Notice: Subject to any disclaimer, the term of this patent is extended or adjusted under 35 U.S.C. 154(b) by 992 days.

(21) Appl. No.: 13/802,571

(22) Filed: Mar. 13, 2013

Related U.S. Application Data

(60) Provisional application No. 61/610,394, filed on Mar. 13, 2012.

(51) Int. Cl.
*G06F 3/06* (2006.01)
*G06F 12/0811* (2016.01)

(52) U.S. Cl.
CPC .................. *G06F 12/0811* (2013.01)

(58) Field of Classification Search
CPC ..... G06F 3/0611; G06F 3/0647; G06F 3/0685
See application file for complete search history.

(56) References Cited

U.S. PATENT DOCUMENTS

| 2011/0197017 A1* | 8/2011 | Yu et al. ...................... 711/103 |
| 2012/0079232 A1* | 3/2012 | Hinton et al. ................ 711/207 |
| 2013/0124787 A1* | 5/2013 | Schuette ...................... 711/103 |

* cited by examiner

*Primary Examiner* — Edward J Dudek, Jr.
(74) *Attorney, Agent, or Firm* — Mahamedi IP Law LLP

(57) ABSTRACT

A memory management module operates to receive a query that identifies a set of data of a logical data structure. The logical data structure is stored with memory resources that are provided on multiple service-level tiers of a network environment, where the multiple service-level tiers may include at least a first tier of memory resources and a second tier of memory resources. From the query, a subset of data is determined that is stored with the second tier of memory resources. The memory management module responds to detecting the condition or event by causing transfer of the subset of data items from the second tier of memory resources to the first tier of memory resources.

18 Claims, 4 Drawing Sheets

MANAGING MEMORY RESOURCES IN A NETWORK ENVIRONMENT IN ORDER TO HANDLE QUERYING OF LOGICAL DATA STRUCTURES

RELATED APPLICATION

This application claims priority to U.S. Provisional Patent Application No. 61/610,394, entitled "Cloud-Based Query Processing And Analysis Platform," filed Mar. 13, 2012, which is hereby incorporated by reference in its entirety.

TECHNICAL FIELD

The disclosed embodiments relate to the field of managing memory resources, and more specifically, to managing memory resources in a network environment in order to handle querying of logical data structures.

BACKGROUND

Cloud computing environments are increasingly in use. Such services typically provide resources, such as memory resources, at varying costs to the tenant.

DETAILED DESCRIPTION

Figure 1:
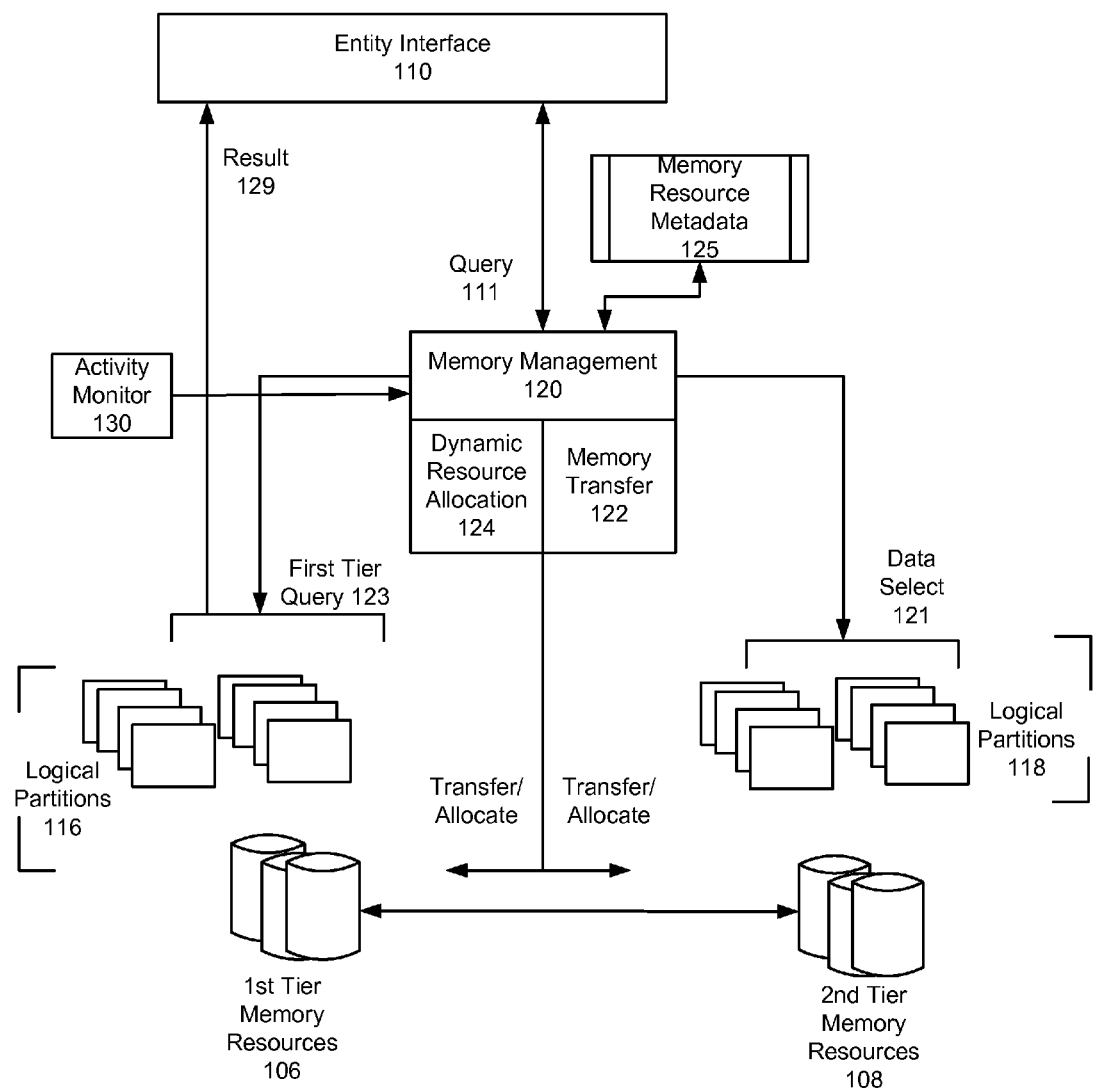
FIG. 1 illustrates a system for managing memory resources amongst multiple service-level tiers in a network environment, according to an embodiment.

Embodiments described herein manage memory resources in connection with enabling querying of a logical data structure that is stored amongst multiple service-levels of a networked environment.

Embodiments described herein enable some portions of the data structure to be stored with memory resources that are immediately queryable, while other portions of the data structure are stored with memory resources that have less capability (e.g., not queryable, or not immediately queryable). However, embodiments provide for portions of the data structure to be transferred into memory resources that are immediately queryable as needed (e.g., responsive to queries). In this way, the logical data structure may be provided in queryable form, while only utilizing queryable memory to store partitions of the data structure that are in actual or anticipated use.

Among other benefits, examples described herein recognize that in many network environments, such as data storage centers or cloud computing environments, memory resources are provided at different service-level tiers, and queryable memory resources are generally considerably more costly than less capable memory resources. In this context, examples enable a logical partition to be provided in queryable form, while relatively unused portions of the data structure are maintained on lower tiered (e.g., not immediately queryable) service levels. Thus, the data structure can be stored and made available for queries in a manner that reduces expense incurred with the use of relatively high-tiered memory resources.

Examples described herein provide for managing data storage for querying processing in a network environment. In an embodiment, a metadata representation is maintained that defines a logical data structure that is queryable to entities of the network environment. The logical data structure may be provided by multiple physical partitions that include a first tier of memory resources and a second tier of memory resources. The logical data structure may be optimized to store data for responses to queries in the first tier of memory resources. A condition or event is detected for providing data stored with the second tier of memory resources in responses to queries. In response to detecting the condition or event, a portion of the logical data structure is transferred from the second tier of memory resources to the first tier of memory resources.

According to some embodiments, a system is provided for managing memory resources for a network environment. The memory management system may include a first set of memory resources that provide a first set of logical partitions for a data structure, and a second set of memory resources that provide a second set of logical partitions for the data structure. The first set of memory resources can be provided as a first tier of memory services in the network environment, and the second set of memory resources can be provided as a second tier of memory services in the network environment. A memory management module can operate to detect a condition or event that is associated with a set of data items of the logical data structure that is stored with the second tier of memory. The condition or event may indicate an actual or probabilistic demand for the set of data items. The memory management module may respond to detecting the condition or event by causing transfer of the set of data items from the second tier of memory to the first tier of memory.

According to another embodiment, a memory management module operates to receive a query that identifies a set of data of a logical data structure. The logical data structure is stored with memory resources that are provided on multiple service-level tiers of a network environment, where the multiple service-level tiers may include at least a first tier of memory resources and a second tier of memory resources. From the query, a subset of data is determined that is stored with the second tier of memory resources. The memory management module responds to detecting the condition or event by causing transfer of the subset of data items from the second tier of memory resources to the first tier of memory resources.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, and network-enabled devices (e.g. portable devices such as cell phones) are all examples of machines and devices that use processors, memory, and instructions stored on computer-readable mediums.

System Overview

FIG. 1 illustrates a system for managing memory resources amongst multiple service-level tiers in a network environment, according to an embodiment. A system 100 such as described by an example of FIG. 1 can be implemented in a variety of computing environments. For example, system 100 can be implemented as part of a cloud computing environment that stores structured indexes, and enables query processing for multiple entities that utilize the cloud computing service. As another example, system 100 can be implemented in a standalone or shared computing environment.

Each service-level tier of memory in a network environment can be characterized by level of capability and/or performance. In one implementation, the first-tier memory resources 106 correspond to a first set of memory resources that are provided by a first tier (or service level tier) of memory services, and the second-tier of memory resources correspond to a second set of memory resources that are provided by a second tier (or service-level tier) of memory services. Among other distinctions, in particular, the first tier of memory resources may be immediately queryable for data (e.g., data stored as part of a logical data structure), while the second tier of memory resources 108 is not be immediately queryable. The first tier of memory resources 106 may also be provided at a higher cost than the second tier of memory resources 108. In an example of FIG. 1, the first tier of memory resources 106 can be characterized as having relatively high performance and/or capability, particularly for storing data in a manner that is queryable. The second-tier memory resource 108 may be characterized as being "non-queryable," or alternatively, queryable but with poor performance. For example, the second-tier memory resources may stream data sets to query entities, and the streaming process can reduce the time of response, particularly for data provided from indexes.

According to an embodiment, a system 100 includes an entity interface 110, a memory management module 120, and an activity monitor 130. The memory management module 120 maintains a metadata set 125 that defines a logical data structure. The logical data structure itself may include multiple logical partitions 116, 118 of the first- and respective second-tiers of memory resources 106, 108. By way of example, the logical data structure can correspond to an index.

The memory management module 120 can enable the creation or specification for queries 111 that utilize data from any portion of the logical data structure. Accordingly, the entity interface 110 promotes an appearance of a whole data structure, and the physical and logical partitioning of the data structure may be transparent to the user.

The memory management module 120 processes individual queries received through the entity interface 110. An individual query can specify data provided as part of the logical data structure. Thus, the logical data structures is queryable in its entirety, even though portions of the logical data structure may reside with multiple tiers of the cloud computing environment, including with the second-tier of memory resources 108 where the logical partitions are not readily queryable.

In an embodiment, the memory management module 120 includes a memory transfer component 122 and a dynamic resource allocation component 124. The memory management module 120 processes the query 111 by identifying components of the query that specify data from the respective first and second tier of memory resources 106, 108. If the components 115 of the query 111 specify only data stored with the first tier 106, then the memory management module 120 queries the first tier of memory resources for one or more result 129. The result 129 can be returned to, for example, the entity interface 110 or the memory management module 120.

If, on the other hand, the query 111 includes a query component 115 that specifies data stored with the second tier of memory resources, the memory management module 120 causes the corresponding data to be transferred from the second tier of memory resources 108 to the first tier of memory resources 106. In one implementation, the memory transfer component 122 can signal a data selection 121 that results in data specified by query 111 in being transferred from the second tier of memory resources 108 to the first tier of memory resources 106. The data selection 121 can identify the specific set of data needed for query 111, or the logical partitions that carry the specified data of the query 111. Once data selection 121 is transferred to the first tier of memory resources 106, memory management module 120 responds to the incoming query 111 using data stored with the first tier of memory resources 106. For example, a first tier query 123 or component thereof can be signaled to the first tier of memory resources 106.

As an addition or variation, the memory management module 120 may monitor for events or conditions that are indicative for the need of a select data set to be transferred from the second tier to the first tier. In one implementation, activity monitor 130 monitors for activity of the first tier of memory resources 106 in order to anticipate when additional data for the logical data structure will be needed at the first tier of memory resources 106. The activity monitor 130 can communicate activity data 131 to the memory management module 120, which can utilize the memory transfer component 122 to transfer select portions of the data structure from the second tier to the first tier.

As an addition or alternative, the memory management module 120 may monitor or anticipate activity levels or data requirements in the amount of memory resources provided with the first tier 106. In one implementation, functionality corresponding to dynamic resource allocation 124 can operate as part of the memory management module 120. The dynamic resource allocation 124 can trigger additional resources being added to the first tier of memory resources 106. In this way, the dynamic resource allocation can increase the amount of resources provided with the first tier of memory resources 106 on-demand (e.g., based on actual need or anticipated need).

In one implementation, the memory management module 120 responds to the incoming query 111 by dynamically allocating more resources from the first set of memory resources 106, then selects the data from the second set of memory resources 108 and transfers the data to the first set of memory resources (thus using the additional memory resources allocated to the first set of memory resources). In an implementation in which the first set of memory resources is provided at a higher cost, the cost of maintaining data in the system 100 in queryable form is reduced, as first tier memory resources are allocated and used when needed.

Methodology

Figure 2:
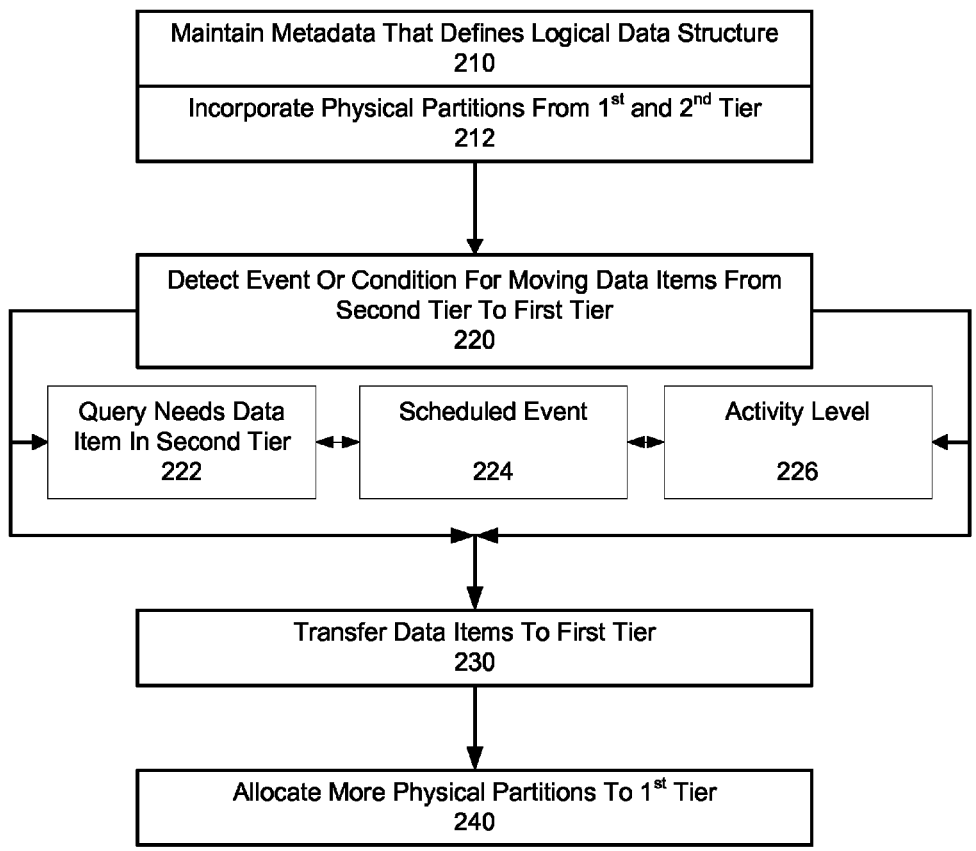
FIG. 2 illustrates a method for managing memory resources amongst multiple service-level tiers in a network environment, according to an embodiment.
Figure 3:
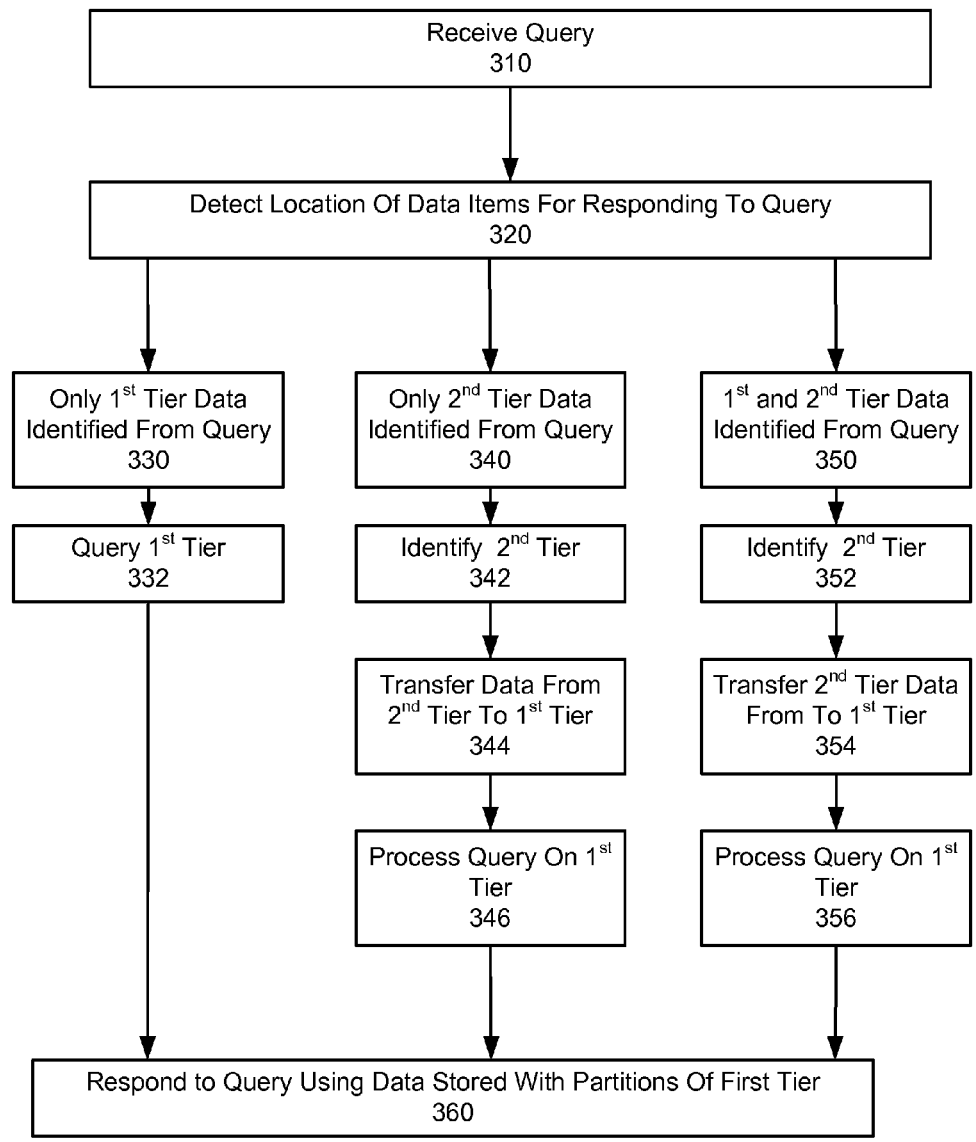
FIG. 3 illustrates a method for responding to queries for data of a logical data structure that is provided amongst multiple service-level tiers of memory resources in a network environment, according to an embodiment.

FIG. 2 illustrates a method for managing memory resources amongst multiple service-level tiers of memory resources in a network environment, according to an embodiment. FIG. 3 illustrates a method for responding to queries for data of a logical data structure that is provided amongst multiple service-level tiers of memory resources in a network environment, according to an embodiment. A method such as described by an example of FIG. 2 can be implemented using components such as described with FIG. 1. Accordingly, reference may be made to elements of FIG. 1 for purpose of illustrating suitable elements or components for performing a step or sub-step being described.

With reference to FIG. 2, metadata is maintained that defines a logical data structure, such as an index (210). The logical data structure can be maintained using distributed physical resources of the networked environment, in a manner that provides an appearance of a whole. In one implementation, the logical data structure is maintained across multiple tiers of memory provided in the network environment. For example, the network environment may provide a first and second tier of memory resources, each of which can include portions of the logical data structured defined by the metadata.

In an embodiment, an event or condition is detected for moving portions of the logical data structure from the second tier of memory resources 108 to the first tier of memory resources 106 (220). The detected condition or event can correspond to an event that indicates an actual need for data stored with the second tier of memory resources 108 (222). For example, an incoming query can specify a data set that resides with the second tier of memory resources 108.

As an addition or alternative, the detected condition or event can be scheduled (224). For example, the usage of the logical data structure may be monitored and modeled. At scheduled times, the usage of the logical data structure can be anticipated to be heavy, requiring, for example, partitions from the second tier of memory resources 108.

Still further, as another addition or alternative, an activity level (e.g., number of queries, data demands of incoming queries) relating to the use of the logical data structure may be monitored or tracked (226). The actual or anticipated usage of the logical data structure can be based on the monitored activity levels.

In response to an event or condition being met, data may be transferred from the second tier of memory resources 108 to the first tier of memory resources within the networked environment (230). The transfer of data may be made one-the-fly, such as in response to an incoming query (e.g., incoming query that specifies partitions of the logical data structure that reside with the second set of memory resources).

In a variation, more physical resources (e.g., physical partitions) can be allocated to support the logical data structure at the first tier of memory resources 106 in response to a detected condition or event (e.g., as described with sub-steps 222-226). The detected condition or event that triggers additional memory resources to support the logical data structure at the first tier can be different than the detected event or condition that cause the transfer of logical partitions from the second tier 108 to the first tier of memory resources 106. But in some implementations, the transfer of additional data from the second tier to the first tier can trigger more physical resources to be allocated to the first tier of memory resources 106.

With reference to FIG. 3, a query is received for processing against a logical data structure that is supported with multiple service-level tier of memory resources (310). The query can be analyzed to determine the location of data required from the query (320).

If the query requires only data from the first tier of memory (e.g., the tier that is immediately queryable) (330), then the first tier of memory resources is queried in accordance with the input query (332).

If the query requires only data from the second tier of memory (e.g., the tier that is immediately queryable) (340), then the data from the second tier is identified (342). For example, the logical partitions of the logical data structure that retain the data specified by the incoming query may be identified. The identified data is then transferred to the first tier of memory in the networked environment (344). The incoming query is then processed on the first tier of memory resources (346).

If the query requires some data from the first tier and from the second tier (350), then the data from the second tier is identified (352). The identified data is then transferred to the first tier of memory in the networked environment (354). The incoming query is then processed entirely on the first tier of memory resources (356).

In response to receiving the incoming query, the query is processed and a data set is returned using only data stored with the first tier of memory resources 106 (360). In this way, the overall performance in responding to an incoming query is maintained by the performance level of the first tier of memory resources. However, since as portion of the logical data structure is maintained by the second tier of memory resources, cost savings is achieved without sacrifice of performance.

Computer System

Figure 4:
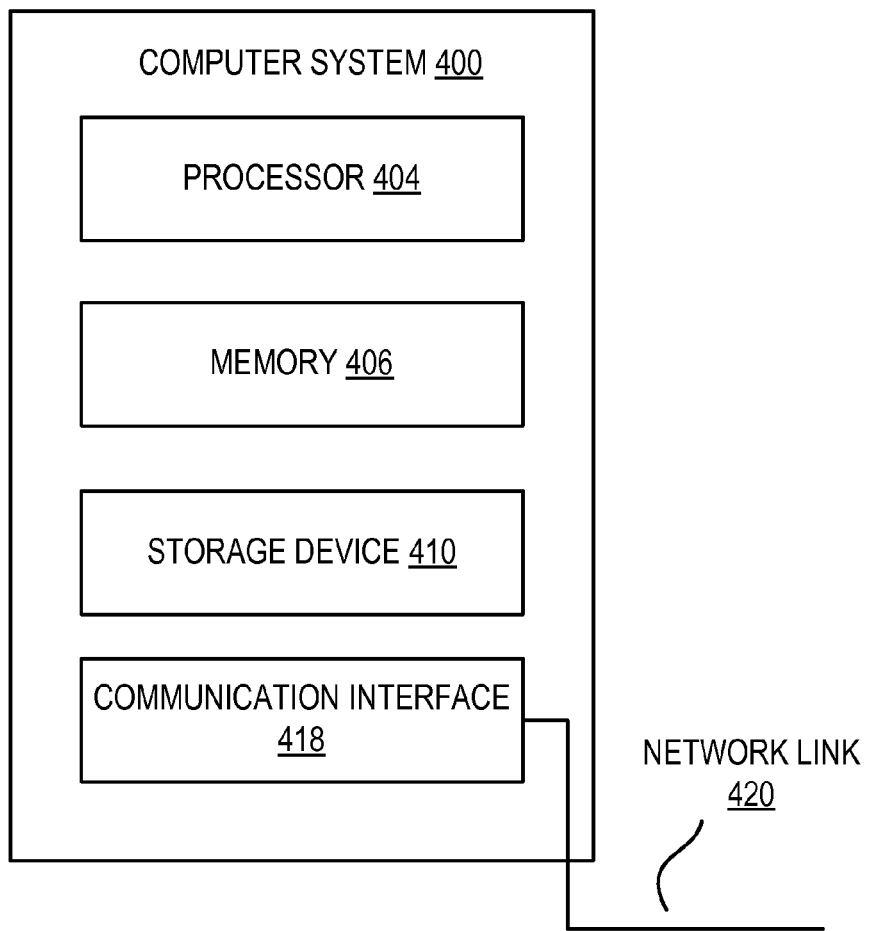
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, system 100 may be implemented using one or more computer systems such as described by FIG. 4.

In an embodiment, computer system 400 includes processor 404, memory 406 (including non-transitory memory), storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 or FIG. 3. Likewise, the processor 404 may execute the instructions in providing functionality as described with FIG. 1, or performing operations as described with an example method of FIG. 2 or FIG. 3.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for managing data storage for query processing in a network environment, the method being implemented by one or more processors and comprising:
   (a) maintaining a metadata representation of a logical data structure that is queryable by entities of the network environment, the logical data structure spanning a first set of logical partitions on a first tier of memory resources and a second set of logical partitions on a second tier of memory resources, the logical data structure being optimized to store data for responses to queries in the first tier of memory resources;
   (b) detecting a condition or event for providing data stored with the second tier of memory resources in response to queries; and
   (c) in response to detecting the condition or event, transferring data from the second tier of memory resources to the first tier of memory resources.

2. The method of claim 1, wherein (b) includes receiving an incoming query that references data stored with the second tier of memory resources, and wherein (c) is performed in response to receiving the incoming query.

3. The method of claim 2, further comprising responding to the incoming query using data stored with the first tier of memory resources, data stored with the first tier of memory resources including the data transferred from the second tier of memory resources.

4. The method of claim 3, wherein (c) includes generating an internal query for the referenced data stored with the second tier of memory resources in response to receiving the incoming query.

5. The method of claim 4, wherein the incoming query references data stored with the first tier of memory resources and with the second tier of memory resources, and wherein the method further comprises returning a result of the incoming query using (i) data that was originally stored with the first tier of memory resources and (ii) data transferred to the first tier of memory resources from the second tier of memory resources.

6. The method of claim 1, wherein (b) includes detecting a scheduled event or condition.

7. The method of claim 1, wherein (b) includes detecting an overall demand for data of the logical data structure.

8. The method of claim 1, wherein (b) monitoring activity in relation to the logical data structure.

9. The method of claim 1, further comprising determining when the first tier of memory resources has insufficient resources to handle one or more queries, and then dynamically allocating additional memory resources to the first tier of memory resources in response.

10. A non-transitory computer-readable medium that stores instructions for managing data storage for query processing in a network environment, wherein the instructions, when executed by one or more processors, cause the one or more processors to perform operations that include:
    maintaining a metadata representation of a logical data structure that is queryable by entities of the network environment, the logical data structure spanning a first set of logical partitions on a first tier of memory resources and a second set of logical partitions on a second tier of memory resources, the logical data structure being optimized to store data for responses to queries in the first tier of memory resources;
    detecting a condition or event for providing data stored with the second tier of memory resources in response to queries; and
    in response to detecting the condition or event, transferring data from the second tier of memory resources to the first tier of memory resources.

11. The non-transitory computer-readable medium of claim 10, wherein instructions for detecting the condition includes receiving an incoming query that references data stored with the second tier of memory resources, and wherein operations for transferring data is performed in response to receiving the incoming query.

12. The non-transitory computer-readable medium of claim of claim 11, further comprising instructions for performing operations that include responding to the incoming query using data stored with the first tier of memory resources, wherein the data stored with the first tier of memory resources including the data transferred from the second tier of memory resources.

13. The non-transitory computer-readable medium of claim of claim 12, wherein instructions for transferring data includes generating an internal query for the referenced data stored with the second tier of memory resources in response to receiving the incoming query.

14. The non-transitory computer-readable medium of claim 13, wherein the incoming query references data stored with the first tier of memory resources and with the second tier of memory resources, and wherein the instructions provide for operations that include returning a result of the incoming query using (i) data that was originally stored with the first tier of memory resources and (ii) data transferred to the first tier of memory resources from the second tier of memory resources.

15. The non-transitory computer-readable medium of claim 10, further comprising instructions for performing operations that include, wherein (b) includes detecting a scheduled event or condition.

16. The non-transitory computer-readable medium of claim 10, further comprising instructions for performing operations that include, wherein (b) includes detecting an overall demand for data of the logical data structure.

17. The non-transitory computer-readable medium of claim 10, further comprising instructions for performing operations that include, wherein (b) monitoring activity in relation to the logical data structure.

18. The non-transitory computer-readable medium of claim 10, further comprising instructions for performing operations that include, further comprising determining when the first tier of memory resources has insufficient resources to handle one or more queries, and then dynamically allocating additional memory resources to the first tier of memory resources in response.

* * * * *